May 21, 1968          T. R. KELLEY          3,384,758

REGULATION SYSTEM FOR MULTIPLE D-C SOURCES

Filed April 28, 1965          4 Sheets-Sheet 1

CHOPPER 16" STARTS CONDUCTING AT 0°
CHOPPER 17" STARTS CONDUCTING AT 90°
CHOPPER 18" STARTS CONDUCTING AT 180°
CHOPPER 19" STARTS CONDUCTING AT 270°

CONDUCTION ANGLE OF ALL CHOPPERS
VARIABLE FROM 0° TO 360°

INVENTOR.
THOMAS R. KELLEY
BY
OSTROLENK, FABER, GERB & SOFFEN
ATTORNEYS

INVENTOR.
THOMAS R. KELLEY
BY
OSTROLENK, FABER, GERB & SOFFEN
ATTORNEYS

3,384,758
**REGULATION SYSTEM FOR MULTIPLE
D-C SOURCES**
Thomas R. Kelley, Audubon, N.J., assignor to I-T-E Circuit Breaker Company, Philadelphia, Pa., a corporation of Pennsylvania
Filed Apr. 28, 1965, Ser. No. 451,402
8 Claims. (Cl. 307—77)

This invention relates to a novel D-C voltage control system, and more particularly relates to a voltage control system for permitting smooth transition from parallel to series operation of a plurality of D-C sources.

An important application of the invention is for a stepless control system for D-C motors used in battery powered traction vehicles.

Many control systems are well known for controlling the amount of current flowing from one or more batteries to a D-C motor which may be used as a vehicle drive or some other drive purpose.

Control systems of the prior art type, when used in battery operated vehicles, often operate to absorb or dissipate various amounts of energy drawn from the batteries in order to control the D-C motor speed. Thus, a certain amount of power is wasted, thus shortening the operating life of the vehicle between battery charging operations.

As a practical example, many fork-lift trucks used within a manufacturing plant or warehouse are commonly driven by D-C motors connected to some appropriate battery supply. The commercial experience with this type of vehicle has been that the vehicle will operate for approximately six hours before battery charging is necessary. This, however, is less than the normal work shift of eight hours so that a working period of two hours is lost. Clearly, it would be greatly desirable to increase the operating life between battery charging operations for such vehicles to the full eight-hour shift period, whereby the vehicles could be operated much more economically.

The principle of the present invention is to provide a novel control circuit for batteries particularly used in driving D-C motors, or more generally, for connecting a plurality of D-C sources to any D-C load wherein the control means is of a non-dissipating nature, while enabling a plurality of D-C sources to be selectively connected from series to parallel relation with an infinite number of control steps.

Non-dissipating control circuits of the type to which the invention relates have been proposed in the past for a single D-C source. Thus, an intermittent switching device or "chopper" is connected in series with the D-C source such as a battery with the length of the conduction period of the chopper being controlled so that the average D-C output current can be regulated in a non-dissipating manner.

The present invention uses a novel chopper type arrangement for a plurality of D-C sources with one chopper being associated with a respective D-C source in a novel circuit arrangement to permit the sources to be selectively connected in series or parallel as desired by the operator.

Thus, in a particular application of the invention, each of a plurality of battery sources are connected in series with a respective chopper device. Each of the choppers are synchronously turned on and off for a predetermined and adjustable conduction period. The output circuit from the chopper is then connected across a respective rectifier with each of the respective rectifiers being connected in series. This series string of rectifiers then defines the output terminals for the regulated output power which can be selectively drawn from the various battery sources. The manner in which the pulse-type outputs from each of the choppers are combined are then determined solely by the length of the conduction period of each of the choppers.

Accordingly, a primary object of this invention is to provide a novel infinitely variable D-C voltage control circuit including a plurality of D-C sources.

Another object of this invention is to provide an improved D-C voltage control system for D-C motor powered traction vehicles.

A further object of this invention is to increase battery life between battery chargings for D-C powered systems.

Still another object of this invention is to permit a smooth transistion from parallel to series operation for a plurality of D-C sources.

These and other objects of this invention will become apparent from the following description when taken in connection with the drawings, in which.

Figure 1:
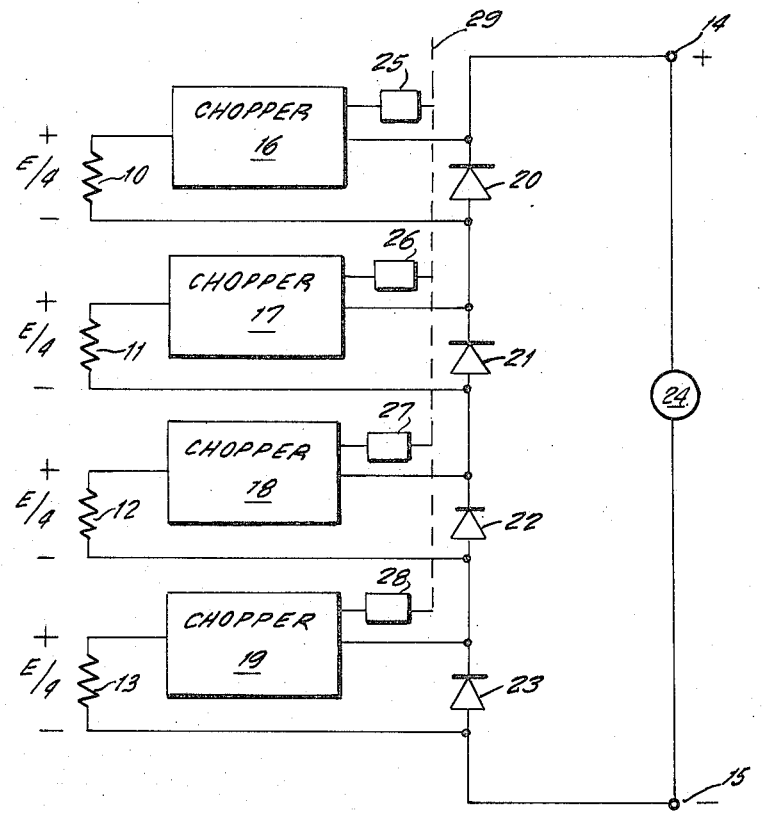
FIGURE 1 shows a schematic diagram of the present invention for four D-C sources which can be smoothly combined from the extremes of series operation to effective parallel operation.

Referring first to FIGURE 1, I have illustrated therein four D-C voltage sources 10, 11, 12 and 13 which may be batteries each having an output voltage which is one-fourth the total maximum output volage which is to appear at output terminals 14 and 15.

Chopper devices 16, 17, 18 and 19 are then connected in series with battery sources 10 through 13, respectively. Rectifier devices 20, 21, 22 and 23 then form a closed circuit with source 10-chopper 16, source 11-chopper 17, source 12-chopper 18, and source 13-chopper 19, respectively. Each of the rectifiers 20 through 23 are then connected in series with one another with the same polarity, and are connected in series with output terminals 14 and 15. The output terminals 14 and 15 are then connected to some suitable load 24 which could, for example, be a D-C motor.

In accordance with the present invention, the average output voltage appearing at terminals 14 and 15 can be regulated in a stepless manner from zero volts to the total series voltage E of sources 10 through 13.

As pointed out above, and as will be shown more fully hereinafter with reference to FIGURE 5, each of choppers 16 through 19 are switching devices which remain closed and conductive for some predetermined length of time, and are thereafter opened. Thus, the choppers will transmit power from their respective source for this predetermined length of time. Each of the choppers will automatically initiate its conduction at a predetermined point, but are controllable to terminate their conduction at some controllable point whereby the average power transmitted by each chopper can be continuously adjusted. Clearly, however, the choppers could be turned off at a fixed point and turned on at a variable point. Alternatively, both the beginning and end of the conduction cycle could be varied.

Thus, FIGURE 1 schematically illustrates control systems 25, 26, 27 and 28 connected to choppers 16 through 19, respectively. A common control means schematically illustrated by dotted line 29 is then ganged to each of the control elements 25 through 28, whereby the length of conduction of each of choppers 16 through 19 can be simultaneously adjusted.

Figure 2:
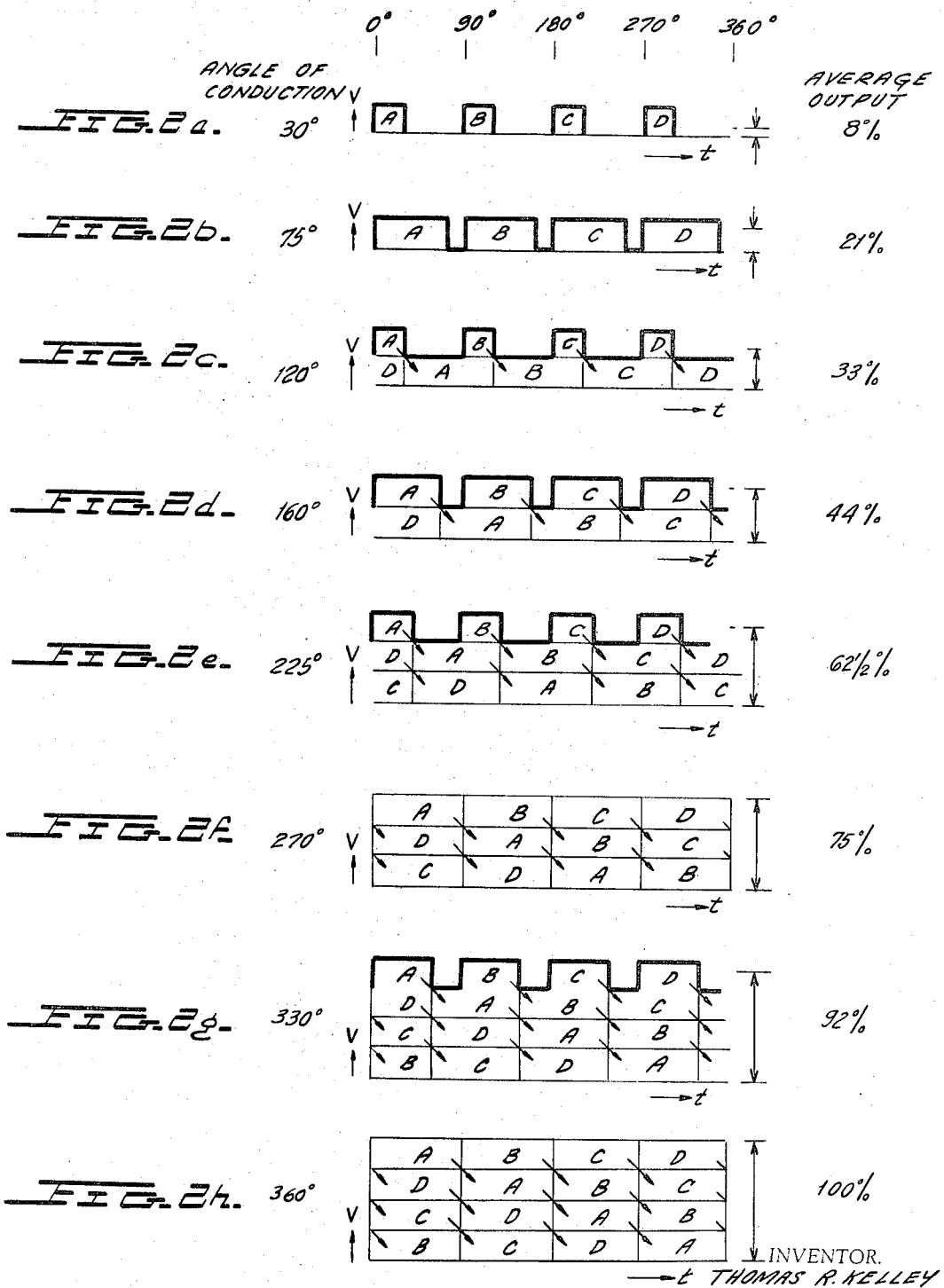
FIGURES 2a through 2h illustrate the pulse-type output from the four choppers of FIGURE 1 for conduction angles of 30°, 120°, 160°, 225°, 270°, 330° and 360°, respectively.

In the particular embodiment of FIGURE 1, and as best shown in FIGURE 2a, chopper 16 begins conduction at 0°; chopper 17 begins conduction at 90°; chopper 18 begins conduction at 180°; and chopper 19 begins conduction at 270°. These beginning points of conduction are fixed. The point at which the conduction of the various choppers ceases, however, is the controlled parameter of the system, and can be adjusted so that each chopper can conduct from 0° up to 360° (where it continuously conducts).

FIGURE 2a particularly illustrates the control condition where each of choppers 16 through 19 conduct for a period of time equivalent to 30°. Under this condition, each of choppers 16 through 19 apply an output voltage across their respective rectifiers 20 through 23, which simulates the parallel connection of these output voltages and currents to be applied across the load 24. Under this condition, and as illustrated at the right of FIGURE 2a, the average output voltage will be 8% of the total available output voltage.

In order to increase the output voltage to load 24, the control means 29 operates control elements 25 through 28 to increase the conduction angle (the length of conduction) of each of choppers 16 through 19. Thus, in FIGURE 2b, the length of conduction for each of choppers 16 through 19 has been increased to 75°. Under this condition, and as shown to the right of FIGURE 2b, the average output voltage is now 21% of the total available output voltage.

As the length of conduction of the choppers 16 through 19 exceeds 90°, it will be seen, for example, in FIGURE 2c that there will be some overlap between the conduction of adjacent choppers. Thus, in FIGURE 2c where each chopper conducts for a period of 120°, chopper 19 conducts at the same time as chopper 16 for a period of 30°. Thereafter, chopper 19 is turned off and only chopper 16 continues to conduct by itself for 60°. At this point, chopper 17 is turned on so that both choppers 16 and 17 simultaneously conduct for another 30° period at which time chopper 16 turns off and chopper 17 conducts by itself.

It is to be specifically noted that the output rectifiers 20 through 23 permit this novel operation to occur whereby the various choppers are, for a short period of time effectively connected in series, as well as in parallel.

With the 120° condition of conduction shown in FIGURE 2c, the average output voltage has now become 33% of the available output voltage of the system. As the conduction angle is still further increased, for example, to 160°, as shown in FIGURE 2d, the average output voltage now becomes 44% of the total available voltage.

In FIGURES 2c and 2d, only two of the choppers conduct simultaneously. However, when the conduction angle is increased beyond 180° and, for example, to 225°, as shown in FIGURE 2e, a condition obtains where, for parts of the cycle, three of the choppers are in series. Thus, at the beginning of the diagram of FIGURE 2e, choppers 17, 19 and 18 all conduct simultaneously for 30°. Thereafter, only choppers 16 and 19 conduct until chopper 17 is turned on so that the three choppers 17, 16 and 19 conduct simultaneously. Under this condition, the average output voltage has increased to 62½% of the total maximum available voltage.

FIGURE 2f illustrates the condition where each of the choppers conducts for 270° so that at any instant three choppers conduct simultaneously. This has the effect of connecting three of the voltage sources in series, whereby the average output voltage now becomes 75% of the total available output. Clearly, continuous increase of the conduction angle can further increase the output to the 92% shown in FIGURE 2g for a 330° conduction for each of the choppers, and finally to the maximum output of FIGURE 2h where each chopper conducts for the full 360° period, thus giving the effect of having the four voltage sources 10 through 13 connected in series with one another and directly across load 24.

From the foregoing description of operation through different conduction angles, it is to be particularly understood that any conduction angle can be selected for the choppers so that any condition of series-parallel arrangement can be obtained for the four voltage sources 10 through 13 in an infinite number of steps.

Moreover, this smooth regulation of output voltage is done in a non-dissipating manner, thereby substantially increasing the life of batteries when batteries are used for sources 10 through 13.

To summarize the operation of the novel invention, it is seen that the pulses of choppers 16 through 19 are synchronized to turn on sequentially at equal intervals with the pulse duration being variable from zero to a continuously ON condition. The rectifiers 20 through 23 provide a by-pass circuit around any source to which it is not connected, each of the rectifiers acting as a switch which closes when voltage is not applied and which automatically opens when voltage is applied from its associated source. By varying the supply pulse widths, the average output voltage may then be varied from zero to 100%, which is the sum of all applied voltages. The sources effectively operate in parallel when pulses do not overlap and make a gradual transition to full series operation when all pulses completely overlap.

In the system of FIGURE 1, the following chart lists average output voltage, the RMS output voltage, and the form factor for the four-source system of FIGURE 1 as compared to a one-source system using a chopper arrangement. Note that the form factor is substantially improved as compared to the one unit type device known to the art, while the RMS output is more linear than for the one unit device.

TABLE SHOWING AVERAGE AND RMS OUTPUTS AND FORM FACTORS

| Conduction Angle | Average, percent | | RMS, percent | | Form Factor, percent | |
|---|---|---|---|---|---|---|
| | 4-Unit | 1-Unit | 4-Unit | 1-Unit | 4-Unit | 1-Unit |
| 30° | 8 | 8 | 14 | 29 | 175 | 360 |
| 75° | 21 | 21 | 23 | 46 | 110 | 220 |
| 90° | 25 | 25 | 25 | 50 | 100 | 200 |
| 120° | 33 | 33 | 35 | 58 | 106 | 175 |
| 160° | 44 | 44 | 46 | 66 | 105 | 150 |
| 180° | 50 | 50 | 50 | 71 | 100 | 140 |
| 225° | 62½ | 62½ | 64 | 79 | 103 | 127 |
| 270° | 75 | 75 | 75 | 87 | 100 | 116 |
| 330° | 92 | 92 | 94 | 96 | 102 | 104 |
| 360° | 100 | 100 | 100 | 100 | 100 | 100 |

Figure 3:
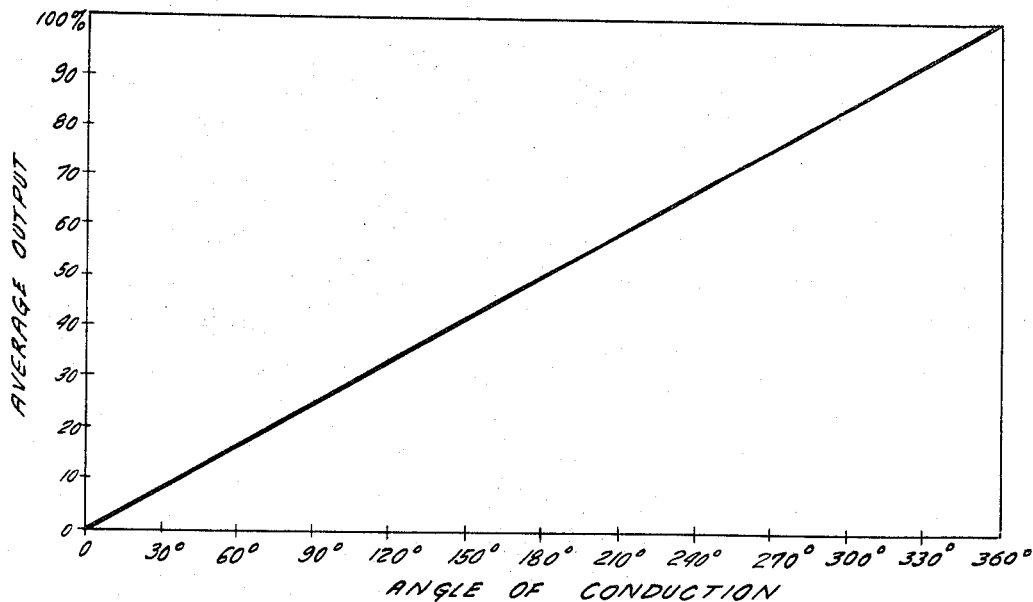
FIGURE 3 illustrates the average output in percentage to any fixed load from the batteries or D-C sources of FIGURE 1 as a function of the angle of conduction of their various choppers.
Figure 4:
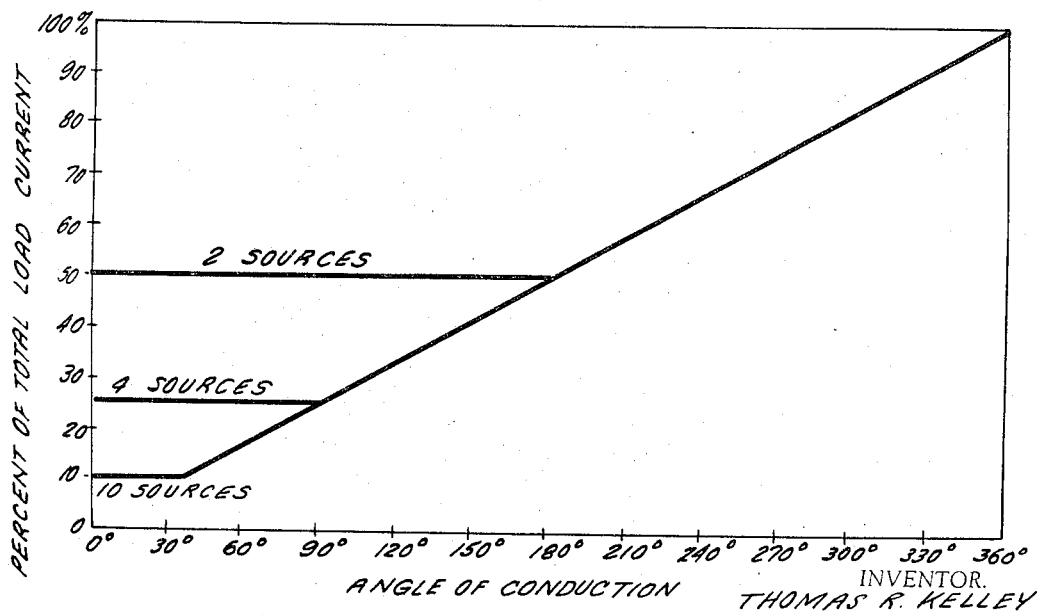
FIGURE 4 illustrates the percentage of total load current drawn from each of a plurality of available D-C sources as a function of conduction angle for various numbers of input sources.

The average output obtained from the unit of FIGURE 1, and shown in FIGURES 2a through 2h and the foregoing chart are plotted in FIGURE 3, while FIGURE 4 shows a similar plot of source current expressed as a percent of total load current as a function of conduction angle (length of conduction) of the various parallel sources for systems using two sources, four sources on ten sources. This particularly illustrates the flexibility of the novel invention, and particularly emphasizes that any number of sources may be used in accordance with the invention.

As pointed out above, variations of ouput voltage can be achieved without introducing resistive losses, although this has been accomplished in the past through the use of a single chopper of variable duty cycle.

An important advantage of the present invention lies in the improved form factor (ratio of average to RMS outputs) obtained by the device. For example, the torque produced by a motor is proportional to average current, while the heating loss is proportional to the RMS current. From the tabulation of the chart above, it is believed apparent that the improved form factor obtained by the plural source arrangement of the invention permits substantially higher efficiency operation from the invention device.

Another advantage of this invention which makes it particularly applicable to motor drive systems is that the sources effectively operate in parallel for low conduction angles and make a gradual transition to series operation for the higher conduction angles. This characteristic is especially advantageous for traction motors which require heavy currents at reduced voltage for starting and increased voltage at lower current as the motor comes up to full speed.

Figure 5:
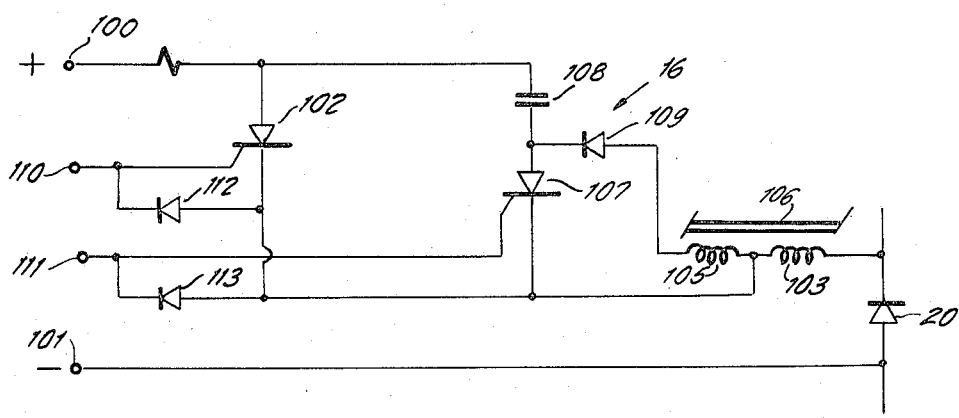
FIGURE 5 is a detailed circuit diagram of a typical chopper circuit which can be used for the choppers schematically illustrated in FIGURE 1.

FIGURE 5 shows one typical type of chopper which could be used as any of choppers 16 through 19 of FIGURE 1. Thus, a typical chopper would have input terminals 100 and 101 to which input voltage source 10 of FIGURE 1 could be connected. This source could typically be a 36 volt battery. Terminal 100 is then connected to the main controlled rectifier 102 which could, for example, have a rating of 150 amperes at 100 volts D-C. The anode of controlled rectifier 102 is then connected through the primary winding 103 of step-up transformer 104 having a secondary winding 105 and a saturable-type core 106.

An auxiliary controlled rectifier 107 and capacitor 108 are then in parallel with controlled rectifier 102 where controlled rectifier 107 could have a rating of 5.0 amperes at 300 volts D-C. Capacitor 108 could be a 200 microfarad capacitor. The bottom of capacitor 108 is then connected to winding 105 through diode 109.

The gate terminals 109 and 110 of controlled rectifiers 102 and 107, respectively, are then connected to a suitable source of timing pulses which control the pulse timing or length of conduction of the chopper output. Suitable diodes 112 and 113 are provided to protect the gates of controlled rectifiers 102 and 107, respectively.

In operation, and when controlled rectifier 102 conducts, a voltage is induced in winding 105 from winding 103 which charges capacitor 108 positively at the bottom through diode 108. Note that core 106 of transformer 104 will saturate after capacitor 108 has been sufficiently charged. In order to shut off controlled rectifier 102, a pulse signal from a suitable source of timing pulses connected to terminal 111 fires controlled rectifier 107 and discharges capacitor 108. This extinguishes controlled rectifier 102 until the next timing pulse is applied to terminal 110 to refire controlled rectifier 102 and recharge capacitor 108.

Figure 6:
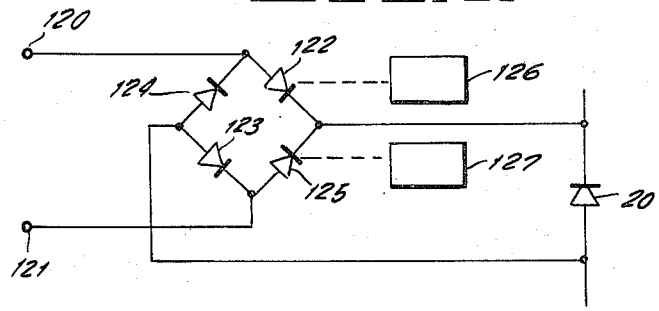
FIGURE 6 shows a circuit diagram of an alternate chopper arrangement for use with A-C sources.
Figure 7:
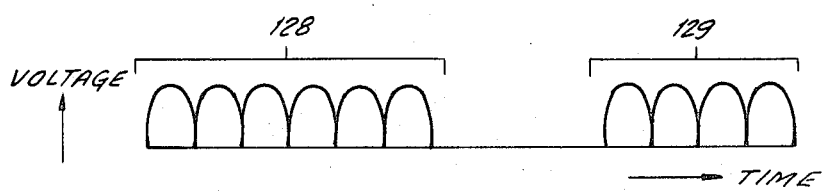
FIGURE 7 shows the output of the circuit of FIGURE 6.

FIGURE 6 illustrates a modified form of the chopper 16 of FIGURE 1 wherein an A-C input source is used as the primary power source in place of source 10 of FIGURE 1 and is connected to terminals 120 and 121. A rectifier bridge formed by two controlled rectifiers 122 and 125 and rectifiers 123 and 124 is then connected to diode 20. The controlled rectifiers 122 and 125 are then provided with suitable firing control means 126 and 127, respectively, which are controllable to permit conduction of a predetermined number of cycles of the A-C source shown as spaced pulse trains 128 and 129 in FIGURE 7. These pulse trains are adjustable in length to define the adjustable conduction intervals of FIGURES 2a through 2h. Note that a three-phase bridge rectifier driven from a three-phase source could have been used in FIGURE 6.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. A D-C voltage regulator for regulating the output of a first and second D-C voltage source; said D-C voltage regulator circuit including a first and second voltage chopper and a first and second rectifier; said first D-C voltage source, said first voltage chopper and said first rectifier being connected in closed series relation with the polarity of said first rectifier in a direction to oppose current flow from said first D-C source; said second D-C voltage source, said second voltage chopper and said second rectifier being connected in closed series relation with the polarity of said second rectifier being in a direction to oppose current flow from said second D-C source; a pair of output terminals; said first and second rectifier being connected in series with said pair of output terminals and having a common polarity for permitting current flow in one direction between said pair of terminals.

2. The regulator of claim 1 wherein said first and second voltage choppers are characterized in synchronously turning on to permit current conduction from their said respective first and second voltage sources, and being rendered non-conductive after a predetermined adjustable time.

3. The regulator of claim 1 wherein said first and second chopper means includes switching means switchable between a conductive and a non-conductive condition, and control means for operating said switching means between their said conductive and non-conductive conditions; said control means synchronously operating said switching means of said first and second choppers to their said conductive conditions and operating said switching means to their non-conductive condition after a predetermined length of conduction.

4. The regulator of claim 1 wherein said first and second D-C voltage sources are batteries.

5. A controllable D-C voltage source for a D-C motor comprising a first and second D-C voltage source; said D-C voltage regulator circuit including a first and second voltage chopper and a first and second rectifier; said first D-C voltage source, said first voltage chopper and said first rectifier being connected in closed series relation with the polarity of said first rectifier in a direction to oppose current flow from said first D-C source; said second D-C voltage source, said second voltage chopper and said second rectifier being connected in closed series relation with the polarity of said second rectifier being in a direction to oppose current flow from said second D-C source; a pair of output terminals; said first and second rectifier being connected in series with said pair of output terminals and having a common polarity for permitting current flow in one direction between said pair of terminals; said pair of output terminals comprising the input terminals of said D-C motor.

6. A D-C voltage regulator for regulating the output of a plurality of D-C voltage sources; said D-C voltage regulator comprising a plurality of voltage choppers and a plurality of rectifiers; each of said D-C voltage sources, a respective one of said plurality of voltage choppers, and a respective one of said rectifiers being connected in a closed series connection with the polarity of each of said rectifiers being in a direction to block current flow from its said respective D-C voltage source; a pair of output terminals; each of said plurality of rectifiers being connected in series with one another and with said pair of output terminals and having a common polarity permitting current flow in one direction between said pair of terminals.

7. The regulator of claim 6 wherein said plurality of voltage choppers are characterized in synchronously turning on at spaced time intervals and are synchronously turned off after a predetermined adjustable conduction time.

8. The regulator of claim 6 wherein each of said D-C voltage sources are batteries.

No references cited.

ORIS L. RADER, *Primary Examiner.*

W. E. DUNCANSON, *Assistant Examiner.*